United States Patent [19]

Aza et al.

[11] Patent Number: 4,837,257

[45] Date of Patent: Jun. 6, 1989

[54] HOMOGENEOUS STORAGE-STABLE LIQUID BARIUM-CADMIUM-TRIPHOSPHITE STABILIZER SYSTEMS FOR POLYVINYL CHLORIDE RESINS

[75] Inventors: Alberto D. Aza, Flushing; Charles Keeley, Wantagh; Jay L. Rogers, Hicksville; Stuart D. Brilliant, Levittown, all of N.Y.

[73] Assignee: Argus Chemical Corporation, Brooklyn, N.Y.

[21] Appl. No.: 216,912

[22] Filed: Jul. 8, 1988

Related U.S. Application Data

[63] Continuation of Ser. No. 128,246, Dec. 3, 1987, abandoned, which is a continuation of Ser. No. 25,894, Mar. 13, 1987, abandoned, which is a continuation of Ser. No. 918,173, Oct. 10, 1986, abandoned, which is a continuation of Ser. No. 804,554, Dec. 4, 1985, abandoned, which is a continuation of Ser. No. 748,523, Jun. 25, 1985, abandoned, which is a continuation of Ser. No. 660,818, Oct. 15, 1984, abandoned, which is a continuation of Ser. No. 481,112, Apr. 1, 1983, abandoned, which is a continuation of Ser. No. 396,529, Jul. 8, 1982, abandoned, which is a continuation of Ser. No. 184,452, Sep. 5, 1980, abandoned.

[51] Int. Cl.$^4$ .................................................. C08K 5/52
[52] U.S. Cl. .............................. 524/151; 252/400.24; 524/153; 524/399; 524/567
[58] Field of Search ..................... 524/399, 151, 153; 252/400.24

[56] References Cited

U.S. PATENT DOCUMENTS

| | | | |
|---|---|---|---|
| 2,847,443 | 8/1958 | Hechenbleikner | 524/180 |
| 3,453,225 | 7/1969 | Pollock | 524/151 |
| 3,533,975 | 10/1970 | Scullin | 524/128 |
| 3,682,853 | 8/1972 | Barie et al. | 524/128 |
| 4,159,973 | 7/1979 | Hoch | 524/151 |

*Primary Examiner*—Veronica P. Hoke

[57] ABSTRACT

Homogeneous storage-stable liquid stabilizer systems for polyvinyl chloride resins are provided which are substantially solvent-free and have a low viscosity and a minimum flash point of 96° C., containing, as the essential ingredients, a liquid barium carbonate-barium alkyl phenate; a cadmium salt of a branched chain $C_5$ to $C_{13}$ aliphatic carboxylic acid and/or of an aromatic $C_7$ to $C_{11}$ carboxylic acid and/or of $C_{12}$ to $C_{22}$ unsaturated aliphatic carboxylic acid; and a liquid organic triphosphite in an amount to form a homogeneous storage-stable liquid; the total weight percent of barium and cadmium in the stabilizer system being at least 13%, and the ratio of the weight percent of cadmium to the weight percent of barium being within the range from about 0.5:1 to about 1.5:1; optionally together with any one or more of a soluble zinc salt of a carboxylic acid, a soluble phenolic antioxidant, a liquid organic acid phosphite, and a soluble carboxylic acid.

41 Claims, No Drawings

HOMOGENEOUS STORAGE-STABLE LIQUID BARIUM-CADMIUM-TRIPHOSPHITE STABILIZER SYSTEMS FOR POLYVINYL CHLORIDE RESINS

This is a continuation of application Ser. No. 128,246, filed Dec. 3, 1987, which in turn is a continuation of Ser. No. 25,894, filed Mar. 13, 1987, which in turn is a continuation of Ser. No. 918,173, filed Oct. 10, 1986, which in turn is a continuation of Ser. No. 804,554, filed Dec. 4, 1985, which in turn is a continuation of Ser. No. 748,523, file June 25, 1985, which in turn is a continuation of Ser. No. 660,818, filed Oct. 15, 1984, which in turn is a continuation of Ser. No. 481,112, filed Apr. 1, 1983, which in turn is a continuation of Ser. No. 396,529, filed July 8, 1982, which in turn is a continuation of Ser. No. 184,452, filed Sept. 5, 1980, all now abandoned.

Stabilizer systems for polyvinyl chloride resins are physically either one of two types: solids and liquids. The first stabilizer systems developed were solids, of which an outstanding example, still in wide use today, is the combinations of metal salt stabilizers and organic triphosphites or hindered phenols of U.S. pat. No. 2,564,646, patented Aug. 14, 1951, to William E. Leistner, Arthur C. Hecker and Olga H. Knoepke. While many of the triphosphites disclosed there are liquids, the metal salts used are mostly solids and no liquid combinations of the two are disclosed. The triphosphite prevents or retards precipitation of solid metal halide from the stabilizer compound as a cloud or haze in the stock, and is therefore referred to as an anti-clouding agent. A preference is indicated for mixtures of barium and cadmium salts, among others, and in the Examples combinations are used of barium and cadmium laurate, with triphenyl phosphite as the anti-clouding agent.

Combinations of mixed barium-cadmium salt stabilizers, such as barium-cadmium laurates, stearates, and ricinoleates, with organic triphosphites have generally been regarded as the first practical barium-cadmium stabilizers, and they do offer excellent initial color and long-term stability. However, one of their major disadvantages is their tendency to "plate-out" on calender rolls and other processing equipment.

"Plate-out" is a condition where the calendering rolls and/or embossing rolls become coated with a deposit from the composition being processed. The deposit may start out as a soft waxy material, just barely visible on the metallic contact surfaces of the processing equipment, but this builds up, particularly during long runs, and both the consistency and the quality of the plate-out can then become prohibitive, and interfere with acceptable surface finish of the film or sheeting. When plate-out occurs, the operation has to be shut down and the plate-out removed, which is a costly and time-consuming nuisance.

The plate-out problem was found to be correlated with the solid state of the stabilizer combination, and the answer to the plate-out problem was found to be a liquid stabilizer system. The first liquid stabilizer systems, still in use today, are those described in U.S. pat. No. 2,716,092, patented Aug. 23, 1955, to William E. Leistner and Arthur C. Hecker. These liquid systems are based on a combination of the polyvalent metal salts, a polyvalent metal salt or salts in conjunction with a water insoluble polyvalent metal salt of a fatty acid, the mixture of the two materials containing to advantage both barium and cadmium in the polyvalent metal component. In a modification, the invention comprises the phenolates and the said salts in conjunction with an organic phosphite. These stabilizer systems were not only liquid but they also showed an enhanced stabilizing effectiveness, as compared to the polyvalent metal salt-triphosphite systems of U.S. pat. No. 2,564,646, and accordingly these liquid systems found ready acceptance. Outstanding typical examples of this type of liquid system, by no means all of those available commercially, are the MARK M and MARK LL stabilizers, the MARK M and MARK LL systems being barium alkyl phenolate/cadmium carboxylate combinations with organic phosphite, and the MARK PL system being for addition of zinc carboxylate to the MARK M and MARK LL systems.

Liquid systems of this type are completely soluble in plasticizers, and consequently they are readily blended with the polyvinly chloride resins on a mill by mixing them with the plasticizers, and then compounding the mix with the resin in the usual plasticization procedure. Used in this way, they are quite advantageous in the stabilization of plasticized polyvinyl chloride resins, and afford excellent initial color and outstanding resistance to the degrading effect of heat and light. High temperature processing is possible without the development of yellow undertones, and of course the plate-out problem is eliminated.

Nonetheless, despite these advantages, the available liquid stabilizer systems have not fully replaced solid stabilizer systems. In order to ensure uniformity, it is necessary that the liquid composition be homogeneous, and this homogeneity must be stable on storage. This has required the combination in the liquid of an inert solvent or other liquid solubilizer, which of course also acts as a diluent, and the result is that, weight for weight, the liquid systems do not offer as much barium or cadmium per unit weight as a solid system. This means that more of the liquid system must be used to obtain the same stabilizing effect.

In rigid polyvinyl chloride resins, the maintenance of rigidity and a high softening or fusion temperature means that any liquids to be incorporated into the polymer mix must be kept to a minimum. It is frequently true that the amount of liquid stabilizer required for stabilization is so high that it is impossible to use the liquid for a rigid polymer without deleteriously affecting the rigidity, and lowering the softening temperature too much. In other cases, the liquid system is unable to compete on the same economic level as a solid system because of its lower metal concentration. Besides that, the presence of the inert solvent reduces the flash point, and makes the mixture flammable, a condition which cannot be tolerated under some circumstances.

Baum, U.S. pat. No. 3,454,514, patented July 8, 1969, discloses a storage-stable stabilizer composition for vinyl halide resin compositions which comprises as a stabilizer base: (a) a cadmium salt of an organic monocarboxylic acid; (b) a salt selected from the group consisting of barium and strontium salts of organic monocarboxylic acids, wherein one of salts (a) and (b) is a salt of an aliphatic monocarboxylic acid and the other is salt of an aromatic monocarboxylic acid, and (c) a zinc salt of an organic monocarboxylic acid; and as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic dicarboxylic acids. The compositions can be liquid, but solid compositions also fall within the scope of the patent.

The barium salts are salts of organic carboxylic acids and of phenols, such as barium laurate, barium stearate, barium dioctyl phenolate, barium di-nonyl phenolate, and barium dinonyl-o-cresolate, but no "overbased" barium carbonate-alkyl phenate salts are disclosed. The barium plus cadmium content of the stabilizer composition is not disclosed, but in Examples 1 to 10, the liquid compositions, it is about 10%. All of the compositions contain 1 to 50 parts diluent by weight.

A recent example of a relatively dilute solvent-based liquid stabilizer system appears in U.S. pat. No. 4,159,973, patented July 3, 1979, to Samuel Hoch, Robert E. Lally and Mario Q. Ceprini. The stabilizer systems provided by this patent comprise:

(a) a liquid, oil-soluble, epoxidized vegetable oil-compatible overbased barium salt complex that is the product obtained by contacting a reaction mixture that consists essentially of a basic barium compound, an alkylphenol, and an inert liquid organic diluent, in the amounts of at least 0.75 mole of alkylphenol per mole of barium compound and 10% to 50% by weight of the diluent, based on the weight of the reaction mixture, with carbon dioxide while the reaction mixture is maintained at a temperature of at least 180° C.;

(b) a polyvalent metal salt component;

(c) an organic phosphite component; and (d) a hydrocarbon solvent in the amounts of 0.1 part to 5 parts by weight of the polyvalent metal salt component;

0.1 part to 5 parts by weight of the organic phosphite component; and 0.1 part to 5 parts by weight of the hydrocarbon solvent per part by weight of the overbased barium salt complex.

These stabilizer systems are said to be compatible with epoxidized vegetable oils and form stable mixtures with such oils.

The hydrocarbon solvents named at the top of column 3 are all flammable, and give liquid stabilizers of relatively low flash point. Indeed, in Table II, columns 7 and 8, the solvent used is described as "high-flash naphtha". Moreover, while the concentration of metal in the liquid is nowhere referred to as a consideration, in the Examples the concentration is relatively low, ranging between 7% and 9%. The ratio of cadmium to barium is also rather low, being approximately 0.4 to 1 in the Examples.

The Hoch et al stabilizer systems are based on a special type of overbased barium salt complex that is prepared in accordance with the procedure described in the patent. Hoch et al point out that the normally available overbased barium alkyl phenate complexes are incompatible with epoxidized soybean oil and other epoxidized vegetable oils, and when they are combined with conventional oil-soluble cadmium and zinc salts and organic phosphites, the blend quickly becomes cloudy, as the epoxidized vegetable oil is mixed in, which presents a handling and storage problem, because the liquid system is not homogeneous. This problem is avoided by the special form of overbased barium alkyl phenate complex of the Hoch et al patent.

A further problem posed by the overbased barium alkyl phenate complexes is their relatively high viscosity, which has to be reduced by blending with a hydrocarbon solvent. This problem is alluded to by Hoch et al, who stress that their overbased barium alkyl phenate complexes are nonviscous liquids that are convenient to handle.

In accordance with the present invention, homogeneous storage-stable liquid polyvinyl chloride resin stabilizer systems are provided that have a low viscosity and a flash point of at least 96° C. because they are substantially solvent-free. These systems are based on (1) a liquid barium carbonate-alkyl phenate stabilizer;

(2) a cadmium salt of a carboxylic acid selected from the group consisting of branched chain aliphatic carboxylic acids having from about five to about thirteen carbon atoms, aromatic carboxylic acids having from about seven to about eleven carbon atoms, and unsaturated aliphatic carboxylic acids having from about twelve to about twenty-two carbon atoms; and (3) a liquid organic triphosphite; the sum of the weight percent of barium and the weight percent of cadmium being at least 13%; and the ratio of the weight percent of cadmium to the weight percent of barium Cd:Ba being within the range from about 0.5:1 to about 1.5:1; the organic triphosphite being in an amount to form a homogeneous storage-stable liquid.

In addition to these ingredients, which are the essential ingredients, these stabilizer systems can include any one or more of (a) a soluble zinc salt of a carboxylic acid;

(b) a soluble phenolic antioxidant;

(c) a soluble carboxylic acid; and (d) a liquid organic acid phosphite.

Cadmium salts of mixtures of aliphatic and aromatic acids appear to offer an enhanced stabilizing effectiveness, and are therefore preferred.

In accordance with the invention, it has been determined that a solvent is not necessary to form a homogeneous storage-stable liquid system if a liquid organic phosphite is selected in which the barium carbonate-alkyl phenate and cadmium carboxylate are soluble. Accordingly, the amount of the organic phosphite is sufficient to form the homogeneous system with the barium carbonate-alkyl phenate and cadmium carboxylate, and any other of ingredients (a), (b), (c), and (d) optionally added, as noted above. This has the advantage that in the absence of any low-boiling solvent, there is no flammable high volatile liquid present, and the flash point of the liquid stabilizer is accordingly at least 96° C. or above while the viscosity of the stabilizer is no more than 400 cps at 25° C.

Because of the solubilizing effect of the triphosphite, it is possible to incorporate an extraordinarily high proportion of the barium carbonate-alkyl phenate and cadmium carboxylate. The minimum is 13 weight % total Ba plus Cd, calculated as the metal, and the total can range to as high as 16%, and even as high as 25%. This high salt metal concentration has the advantage that much less of the liquid system is required, and virtually renders the liquid system equivalent to a solid system on a weight for weight basis of metal stabilizer. This means that much less is needed in rigid polyvinyl chloride resins, for example, so that the liquid stabilizer systems of the invention can be used in rigid polymers without deleterious effect on the rigidity and softening point.

The high stabilizing effectiveness of the liquid systems of the invention appears to be due in large measure to the stated ratio of cadmium to barium. In proportions of cadmium to barium outside the range, for example, less barium than the Cd:Ba ratio of 0.5:1, the stabilizing effectiveness is much reduced, which means that more of the stabilizer is required, which in turn would put the composition in the same category as the earlier available low metal concentration liquid systems.

It further appears that the carboxylic acid anion of the cadmium salt is important to stabilizing effectiveness. The cadmium salts of saturated straight chain aliphatic carboxylic acids having from five to twenty-two carbon atoms, for example, are not nearly as effective as the cadmium salts of the acids within the above-described classes. The reason for this is not at present understood.

The liquid barium carbonate-alkyl phenate is known and described in U.S. pat. No. 3,787,357, patented Jan. 22, 1974, to Lawrence Robert Brecker. The barium carbonate is combined with at least one barium alkyl phenate, usually in a relatively nonvolatile organic liquid, which acts as a liquefying agent for the carbonate, by itself or in combination with a nonvolatile polar compound. The barium alkyl phenate disperses the carbonate in the organic solvent during or after its formation.

The relatively nonvolatile organic liquid can be a hydrocarbon oil, a plasticizer, an epoxy ester, etc., or a combination thereof.

The proportion of barium carbonate to organic salt in this oarbonate-organic salt combination is defined by the metal ratio, which is a number greater than 2, i.e., the number of metal equivalents is greater than the number of equivalents of the organic acid residue of the organic salt. The metal ratio can be as high as 20, or even higher, the limit being imposed only by an unacceptably high viscosity of the barium carbonate-barium alkyl phenate combination.

The alkyl phenate residue of the barium alkyl phenate has at least ten carbon atoms. There is no upper limit for the carbon content except that set by the availability of materials. Barium alkyl phenates with as many as 150 carbon atoms in the alkyl phenate residue give excellent results.

Exemplary alkyl phenols that can be used as their barium salt include secondary butyl-phenol, o-amyl-phenol, heptyl-phenol, tert-nonyl-phenol, capryl-phenol, 6-t-butyl-2,4-dimethyl-phenol, 2,6-di-tert-butyl p-cresol, p-t-octyl-phenol, di-nonyl-phenol, decyl-phenol, dodecyl-phenol, and paraffin wax-alkyl-phenol; cycloalkyl-phenols such as o-cyclohexyl-phenol, p-cyclohexyl-phenol, and cyclooctyl-p-cresol; aralkyl-phenols such as 4-benzyl-o-cresol and ortho- and para-alphamethylbenzyl-phenols, and mixtures thereof.

The barium alkyl phenate salt may contain free unreacted phenol.

These barium carbonate-barium alkyl phenates are visually clear liquids, and leave no residue on filtration.

Many liquid barium carbonate-barium alkyl phenates are known. There is an extensive patent literature describing the preparation of such compositions. Unfortunately, the terminology employed is not uniform. Such compositions are sometimes referred to as solutions of oil-soluble barium carbonates, and sometimes as dispersions of oil-insoluble barium carbonates. The compositions are often called "overbased", to indicate that the ratio of total barium contained therein to the organic moiety is greater than the stoichiometric ratio of the neutral barium alkyl phenate, i.e., the number of barium equivalents is greater than the number of equivalents of the alkyl phenate residue.

Analytical techniques are available for determining the barium ratio and to characterize the liquid combinations of barium carbonate with barium alkyl phenate. The total barium content can be determined by standard methods such as atomic absorption, or extraction into aqueous hydrochloric acid, and complexometric titration of the barium in the extract.

The barium present as carbonate is measured in terms of the combined carbon dioxide content and the metal ratio is given by the expression:

$$2 \times \frac{\text{total equivalents of barium/g of sample}}{\text{total equivalents of barium/g of sample} - \text{equivalents } CO_2/g}$$

Liquid barium carbonates can be readily prepared by suspending, for instance, a barium base, e.g., oxide, hydroxide, alkoxide, carboxylate, phenate, etc., in a polar organic medium, carbonating the barium compound at elevated temperatures, and transferring the carbonated product to a relatively nonvolatile organic liquid containing a barium alkyl phenate with or without subsequent hydrolysis and removal of volatiles before final filtration of the resulting liquid. The sequence of operations is not critical; the barium alkyl phenate can be present during the carbonation.

The polar organic medium used for the reaction can contain volatile and nonvolatile polar compounds, called promoters in the literature. The volatile polar compounds are removed during the process and are not present in the finished product. A comprehensive overview of liquid organic combinations of barium carbonates, with barium alkyl phenates, their ingredients and their methods of manufacture can be obtained from a selected group of patents, for example, P. Asseff U.S. pat. No. 2,616,905, F. Koft U.S. pat. No. 3,544,463, and W. LeSuer U.S. pat. No. 2,959,551.

A number of commercially available liquid barium carbonate-barium alkyl phenate compositions are suitable for use in preparing the liquid stabilizer systems of this invention. The following represents a nonlimiting selection:

| Material | Supplier | % Ba |
|---|---|---|
| Barium carbonate-barium dodecyl phenate | Lubrizol Corp. Wickcliffe, Ohio | |
| LD 2106 | | 26 |
| LD 2103 | | 23 |

The cadmium carboxylate is a salt of a nonnitrogenous monocarboxylic acid having from about five to about twenty-two carbon atoms, and selected from the group consisting of
 (a) branched chain aliphatic carboxylic acids having from about five to about thirteen carbon atoms;
 (b) aromatic carboxylic acids having from about seven to about eleven carbon atoms; and
 (c) unsaturated aliphatic carboxylic acids having from about twelve to about twenty-two carbon atoms.

Exemplary branched chain aliphatic carboxylic acids include $\beta$-methyl butyric acid, $\alpha$-methyl butyric acid, 2-ethyl hexoic acid, isooctoic acid, 3,5,5-trimethyl hexoic acid, trimethyl acetic acid, 2,2-dimethyl pentanoic acid, neodecanoic acid, and 2-methyl-2-ethyl hexoic acid.

Exemplary unsaturated aliphatic carboxylic acids include oleic acid, linoleic acid, linolenic acid, ricinoleic acid and erucic acid.

Exemplary aromatic acids include benzoic acid, ortho-, meta- and para-toluic acid; ortho-, meta- and para-ethylbenzoic acid; ortho-, meta- and para-butyl benzoic acid; ortho-, meta- and para-amyl benzoic acid; the various dimethyl benzoic acid isomers; the various diethyl benzoic acid isomers; and the various trimethyl benzoic acid isomers.

The cadmium carboxylate can be a liquid or a solid, in which case it is soluble in the liquid stabilizer system. A solid cadmium carboxylate can also be liquefied in course of preparation, by carrying out the formation of the salt in the presence of a high-boiling organic solvent for the resulting cadmium carboxylate. This solvent will then be present in the finished cadmium salt, and accompany it in the blending with the other components of the liquid stabilizer system. The solvent, if used, should have a boiling point of at least 180° C., and the maximum amount should not exceed 12% solvent by weight of the stabilizer system, after combination of the liquefied cadmium carboxylate with the other components.

Useful solvents include aliphatic, cycloaliphatic, and aromatic hydrocarbons; aliphatic, cycloaliphatic and aromatic alcohols, ether alcohols, and ether alcohol esters; and esters of organic and inorganic acids, such as the alkyl, cycloalkyl and aryl phosphoric acid esters, benzoic acid esters, and stearic acid esters. Illustrative preparations of the liquefied cadmium carboxylate are given in the Examples.

Inasmuch as solvent may accompany the liquefied cadmium carboxylate in the homogeneous liquid stabilizer systems of the invention, the term "substantially solvent-free" when used to describe the systems of the invention does not exclude such solvent in amounts up to 12% by weight of the liquid stabilizer system.

The zinc carboxylate is a salt of a nonnitrogenous monocarboxylic acid having from about five to about twenty-two carbon atoms, and selected from the group consisting of (a) branched chain aliphatic carboxylic acids having from about five to about thirteen carbon atoms;

(b) aromatic carboxylic acids having from about seven to about eleven carbon atoms; and (c) unsaturated aliphatic carboxylic acids having from about twelve to about twenty-two carbon atoms.

Exemplary branched chain aliphatic carboxylic acids include β-methyl butyric acid, α-methyl butyric acid, 2ethyl hexoic acid, isooctoic acid, 3,5,5-trimethyl hexoic acid, trimethyl acetic acid, 2,2-dimethyl pentanoic acid, neodecanoic acid, and 2-methyl-2-ethyl hexoic acid.

Exemplary unsaturated aliphatic carboxylic acids include oleic acid, linoleic acid, linolenic acid, ricinoleic acid and erucic acid.

Exemplary aromatic acids include benzoic acid, ortho-, meta- and para-toluic acid; ortho-, meta- and para-ethylbenzoic acid; ortho-, meta- and para-butyl benzoic acid; the various dimethyl benzoic acid isomers; the various diethyl benzoic acid isomers; and the various trimethyl benzoic acid isomers.

The zinc carboxylate can be a liquid or a solid, in which case it is soluble in the liquid stabilizer system. A solid zinc carboxylate can also be liquefied in course of preparation, by carrying out the formation of the salt in the presence of the same high-boiling organic solvent used for the cadmium carboxylate. This solvent will then be present in the finished zinc salt, and accompany ing it in the blending with the other components of the liquid stabilizer system.

The organic triphosphite ester is a liquid over the temperature range from the lowest atmospheric temperatures to be encountered, about $-10°$ C., up to about 200° C. The useful organic triphosphites have from one to three organic radicals attached to phosphorous through oxygen with all three valences of the phosphorus taken up by such organic radicals.

The liquid organic triphosphites in which the radicals are monovalent radicals can be defined by the formula:

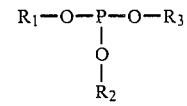

in which $R_1$, $R_2$ and $R_3$ are selected from the group consisting of alkyl, alkenyl, aryl, alkaryl, aralkyl, and cycloalkyl groups having from one to about thirty carbon atoms.

The liquid organic triphosphites having a bivalent organic radical form a heterocyclic ring with phosphorous of the type:

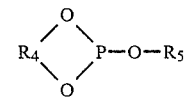

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful liquid organic triphosphites are mixed hetero-cyclic-open chain phosphites of the type:

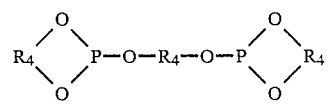

More complex liquid triphosphites are formed from trivalent organic radicals, of the type:

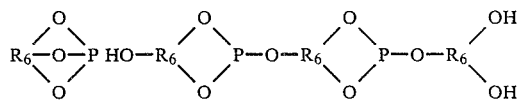

in which $R_6$ is a trivalent organic radical of any of the types of $R_1$ to $R_5$, inclusive, as defined above.

A particularly useful class of complex liquid triphosphites are the tetraoxadiphosphaspiro undecanes of the formula:

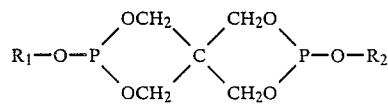

where $R_1$ and $R_2$ are selected from the group consisting of aryl, alkyl, aryloxyethyl, alkyloxyethyl, aryloxyethoxyethyl, alkyloxy-ethoxyethyl and alkyloxypolyethoxyethyl having from about one to about thirty carbon atoms.

An especially preferred class of liquid organic triphosphites have a bicyclic aromatic group attached to phosphorus through oxygen, with no or one or more phenolic hydroxyl groups on either or both of the aromatic rings. These phosphites are characterized by the formula:

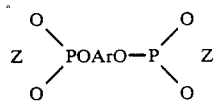

or

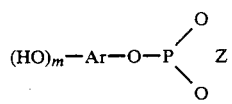

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals can include additional bicyclic aromatic groups of the type $(HO)_m$-Ar.

Usually, the triphosphites do not have more than about sixty carbon atoms.

Exemplary liquid triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, tri(tridecyl)phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octyl-phenyl)phosphite, di(2-ethylhexyl) (isooctylphenyl)phosphite, tri(2-phenylethyl)phosphite, ethylene phenyl phosphite, ethylene isohexyl phosphite, ethylene isooctyl phosphite, ethylene cyclohexyl phosphite, 2-phenoxy-5,5-dimethyl-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary liquid pentaerythritol triphosphites are 3,9-diphenoxy-2,4,8,10-tetraoxa-3,9-diphosphaspiro-(5,5)-undecane (diphenyl-pentaerythritol-diphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10—tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9diphosphaspiro-(5,5)-undecane; 3methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4.8,10-tetraoxa-3,9-diphosphaspiro-(5,5)-undecane; 3,9di(methoxy(polyethoxy)ethyloxy)-2,4,8,10-tetraoxa-3,9-diphosphaspiro-(5,5)-undecane (where the (polyethoxy)ethyloxy group has an average molecular weight of 350) 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary liquid bis aryl triphosphites are: bis (4,4'-thio-bis(2-tertiary butyl-5-methyl-phenol)) isooctyl phosphite, mono(4,4'-thio-bis(2-tertiary-butyl-5-methyl phenol)) di-phenyl phosphite, tri-(4,4'-n-butylidene-bis(2-tertiary-butyl-5-methyl-phenol))phosphite, (4,4'-benzylidene-bis(2-tertiary-butyl-5-methyl phenol)-)diphenyl phosphite, isooctyl 2,2'-bis(-parahydroxyphenyl)propane phosphite, decyl 4,4'-n-butylidene-bis(2-tertiary-butyl-5-methylphenol)phosphite, tri-4,4'-thio-bis(2tertiary-butyl-5-methylphenol)phosphite, 2-ethylhexyl-2,2'-methylene-bis-(4-methyl-6,1'-methylcyclohexyl)phenol phosphite, tri(2,2'-bis-(para-hydroxyphenyl)propane)phosphite, tri(4,4'-thio-bis(2-tertiary butyl-5-methyl-phenol)phosphite, isooctyl-(2,6-bis(2'-hydroxy-3,5-dinonylbenzyl)-4-nonyl phenyl))phosphite, tetra-tridecy 4,4'-n-butylidene-bis(2-tertiary butyl-5-methyl phenyl)diphosphite, tetra-isooctyl 4,4'-thio-bis(-2tertiary butyl-5-methyl phenyl)diphosphite, 2,2'methylene-bis(4-methyl 6,1'-methyl cyclohexyl phenyl)polyphosphite, isooctyl-4,4'isopropylidene-bis-phenyl-polyphosphite, 2,2'-methylene-bis(4-methyl-6,1'-methylcyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl)diphosphite, tetra-tridecyl-4,4'-iso-propylidene bisphenyl diphosphite, hexatridecyl butane-1,1,3-tris(2'methyl-5'-tertiary-butyphenyl-1-4'-) triphosphite.

The acid phosphite can be any organic phosphite having one or two organic radicals attached to phosphorus through oxygen, and one or two hydrogen atoms.

The acid phosphites are defined by the formula:

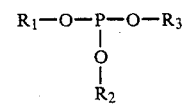

in which $R_1$, $R_2$ and $R_3$ are selected from the group consisting of hydrogen, alkyl, alkenyl, aryl, alkaryl, aralkyl, and cycloalkyl groups having from one to about thirty carbon atoms, and at least one to two of $R_1$, $R_2$ and $R_3$ is hydrogen.

Exemplary liquid acid phosphites are di(phenyl)-phosphite, monophenyl phosphite, mono-(dipheny)-phosphite, dicresyl phosphite, di-o-(isooctyphenyl)-phosphite, di(p-ethylhexylphenyl) phosphite, di(p-t-octyphenyl)phosphite, di(dimethylphenyl) phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl-(n-octylphenyl)-phosphite, monocyclohexyl phosphite, dicyclohexyl phosphite, di(2-cylohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary liquid bis aryl acid phosphites are: bis(4,4'-thio-bis(2-tertiary-butyl-5-methyl-phenol))-phosphite, (4,4'-thio-bis(2-tertiary-butyl-5-methyl-phenol)) phenyl phosphite, bis(4,4'-n-butylidene-bis(2-tertiary-butyl-5-methyl-phenol))phosphite, mono(4,4'-benzylidene-bis(2-tertiary-butyl-5-methyl-phenol))-phosphite, mono(2,2'-bis-(parahydroxyphenyl)-propane)phosphite, mono(4,4'-n-butylidene-bis(2-tertiary-butyl-5-methyl-phenol)phosphite, bis(4,4'-thio-bis(2-tertiary-butyl-5-methylphenol))phosphite, mono-2ethylhexyl-mono-2,2'methylene-bis(4methyl-6,1'-methylcyclohexyl)phenol phosphite, bis(2,2'-bis-(parahydroxyphenyl)propane)phosphite, monoisooctyl mono(4,4'-thio-bis(2-tertiary-butyl-5-methyl-phenol))-phosphite, isooctyl-(2,6-bis(2'-hydroxy-3,5-dinonylbenzyl)-4-nonyl phenyl))phosphite, tri-tridecyl 4,4'-n-butylidene-bis(2-tertiary-butyl-5-methyl phenyl)diphosphite, triisooctyl 4,4'-thio-bis(2-tertiary-butyl-5-methyl phenyl)diphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'methyl-cyclohexyl))triphosphite, di-tridecy-4,4'-oxydiphenyl diphosphite, di-n-dodecyl-4,4'-n-butylidene bis(2-tertiary-butyl-5-methylphenyl)diphosphite, di-tridecyl-4,4'-isopropylidene bisphenyl diphosphite, tetra-tridecyl butane-1,1,3-tris(2'-methyl-5-tertiary-butylphenyl-4)triphosphite.

The phenolic antioxidant should be a liquid, but need not be, since it is soluble in the liquid stabilizer system, and contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatability with the liquid stabilizer system, and therefore there is no upper limit on the number of alkyl carbon atoms. Usually from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

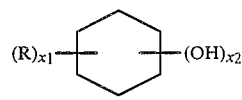

R is selected from the group consisting of hydrogen; halogen; and organic radicals containing from one to about thirty carbon atoms, such as alkyl, aryl, alkenyl, alkaryl, aralkyl, cycloalkenyl, cycloalky, alkoky, and acyl,

where R' is aryl, alkyl or cycloalkyl;

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

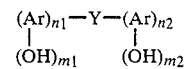

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloakyl, or thiohydrocarbon groups having from one to about thirty carbon atoms, and carboxyl

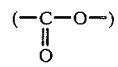

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

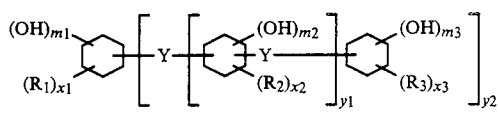

wherein $R_1$, $R_2$, and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four; and $x_2$ is an integer from zero to three;

$y_1$ is an integer from zero to about six; and $y_2$ is an integer from one to five, preferably one or two.

Preferably, the hydroxyl groups are located ortho and/or para to Y.

Exemplary Y groups are alkylene, alkylidene, and alkenylene arylene, alkylarylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to sub-genera as follows:

(1) Y groups where at least one carbon in a chain or cyclic arrangement connect the aromatic groups, such as:

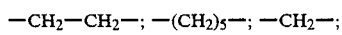

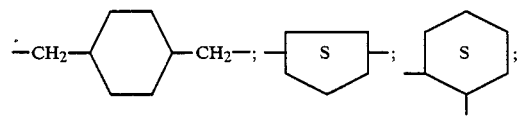

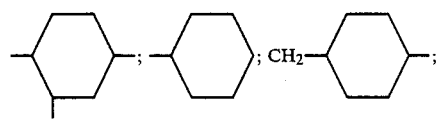

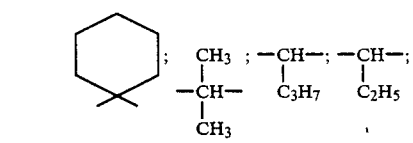

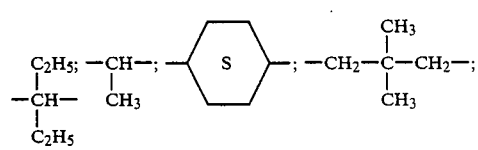

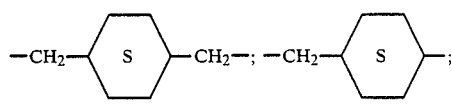

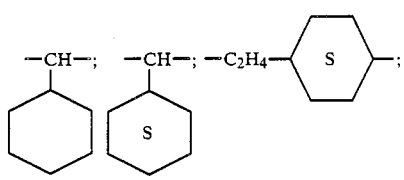

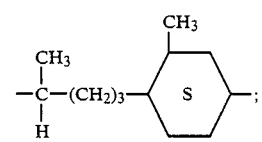

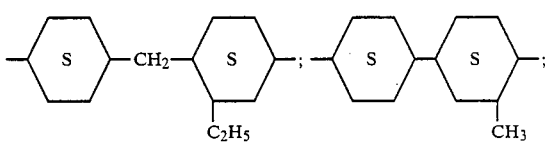

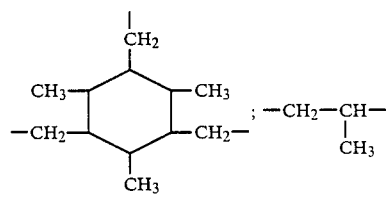

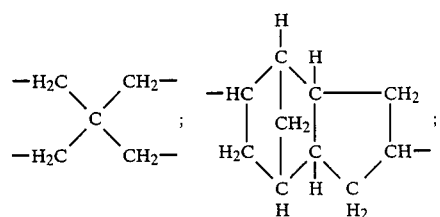

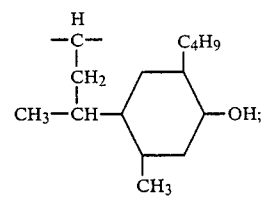

(2) Y groups made up of more than a single atom including both carbon and other atoms linking the aromatic nuclei, such as:

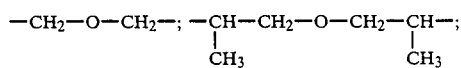

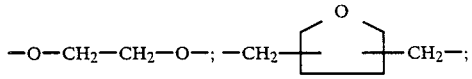

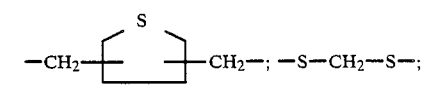

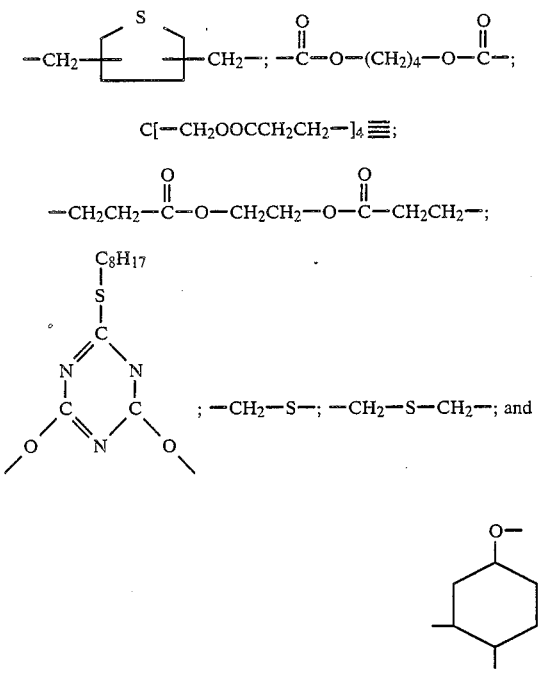

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o-, m- and p-nonylphenol, o-, m-and p-dodecyl-phenol, and o-, m- and p-octyl phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol methyl-p-hydroxy benzoate, p-di-chlorobenzoyl-aminophenol, p-hydroxysalicyl anilide, stearyl-(3,5-di-methyl-4-hydroxy-benzyl) thioglycolate, stearyl-β-(4-hydroxy-3,5-di-t-butylphenyl) propionate, distearyl-3,5-di-t-butyl-4-hydroxybenzylphosphonate, and distearyl (4-hydroxy-3-methyl-5-t-butyl) benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis-(2-tertiary-butyl-5-methyl-phenol), 4,4'-cyclohexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-n-butylidene-(2-t-butyl-5-methyl-phenol),2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'methyl-benzyl)-4-methyl-phenol, 1,3'-bis-(naphthalene-2,5-diol) propane, and 2,2'-butylene bis-(naphthalene-2,7-diol), (3-methyl-5-tert-butyl-4-hydroxyphenyl)-4'-hydroxyphenyl) propane, 2,2'-methylene-bis-(4-methyl-5-isopropylphenol), 2,2'-methylene bis-(5-tert-butyl-4-chlorophenol), (3,5-di-tert-butyl-4-hydroxyphenyl)-(4'-hydroxy-phenyl) ethane, (2-hydroxy-phenyl)-(3',5'-di-tert-butyl-4', 4-hydroxyphenyl) ethane, 2,2'-methylene bis-(4-octylphenol), 4,4'-propylene bis-(2-tert-butyl-phenol), 2,2'-isobutylene bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 4,4'-bis -(4-hydroxy-phenyl) pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thidiethanol bis-(3-tert-butyl-4-hydroxy-phenoxy acetate), 1,4-butanediol-bis-(3-tert-butyl-4-hydroxy-phenoxy acetate), pentaerythrioroltetra-(4-hydroxyphenol propionate), 2,4,4'-tri-hydroxy benzophenone, 4,4'-bis-(4-hydroxy-phenol) pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane,1,8-bis-(2-hydroxy-5methylbenzoyl-n-octane, 1-methyl-3-(3-methyl-5-tert-butyl-4-hydroxy-benzyl)-naphthalene, 2,2'-(2-butene)-bis-(4-methoxy-6-tert-butyl phenol)-bis-[3,3-bis-(4-hydroxy-3-t-butylphenyl) butyric acid] glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis [methylene-3-(3,5-di-t-butyl-4-hydroxyphenyl) propionate] methane, 1,3,5-tris-(3,5-di-t-butyl-4-hydroxybenzyl(isocyanurate, 1,3,5-tris-(3,5-di-t-butyl-4-hydroxyphenyl) propionyl-oxyethyl isocyanurate, 2-octylthio-4,6-di-(4-hydroxy-3,5-di-t-butyl) phenoxy-1,3,5-triazine, and pentaerythritol hydroxyphenyl propionate.

A particularly desirable class of polyhydric polycyclic phenols are the dicyclopentadiene polyphenols, which are of the type:

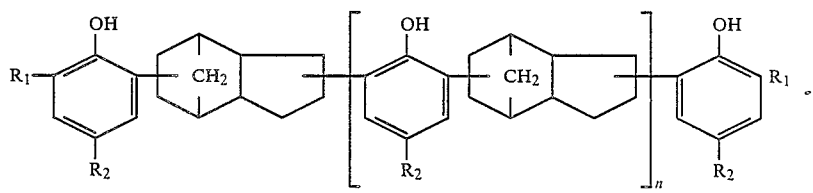

in which

R$_1$ and R$_2$ are lower alkyl, and can be the same or different, and n is the number of the groups enclosed by the brackets, and is usually from 1 to about 5. These are described in U.S. pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

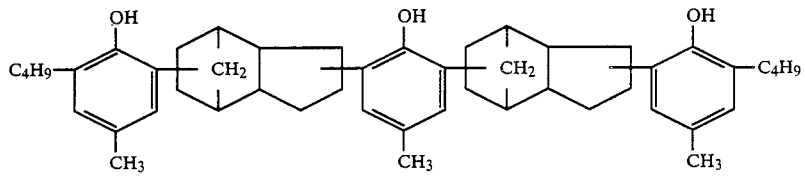

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus (1). For method of preparation, see e.g., U.S. pat. Nos. 3,124,555, 3,242,135 and British pat. No. 961,504.

The free soluble carboxylic acid, if present, is not used in an amount exceeding about 15% by weight of the cadmium carboxylate salt. The soluble aliphatic carboxylic acids are usually unsaturated, and examples thereof include oleic, palmitooleic, linoleic, linolenic, ricinoleic, erucic and brassidic acids. Soluble aromatic acids include benzoic, p-t-butyl-benzoic and o-, m- and p-toluic acids.

The liquid stabilizer systems of the invention are effective in enhancing the resistance to deterioration by heat and light of any polyvinyl chloride resin. The term "polyvinyl chloride" as used herein is inclusive of any polymer formed at least in part of the recurring group:

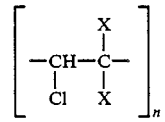

and having chlorine content in excess of 40%. In this group, the X groups can each be either hydrogen or chlorine, and n is the number of such units in the polymer chain. In polyvinyl chloride homopolymers, each of the X groups is hydrogen. Thus, the term includes not only polyvinyl chloride homopolymers but also after-chlorinated polyvinyl chlorides as a class, for example, those disclosed in British pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The stabilizer systems are effective also with mixtures of polyvinyl chloride in a major proportion with a minor proportion of other synthetic resins such as chlorinated polyethylene or a copolymer of acrylonitrile, butadiene and styrene.

These liquid stabilizer systems are of particular application to the stabilization of rigid polyvinyl chloride resin compositions, that is, resin compositions which are formulated to withstand high processing temperatures, of the order of 375° F. and higher, and whose mechanical strength would be adversely affected by an unduly high amount of liquid or low melting additive.

The stabilizer compositions of the invention can also be used with plasticized polyvinyl chloride resin compositions of conventional formulation, even though resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from 20 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic, and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized coconut oil, epoxidized cotton-seed oil, epoxidized tall oil fatty acid esters and epoxidized tallow. Of these, epoxidized soybean oil is preferred.

The alcohol can contain the epoxy group and have a long or short chain, and the acid can have a short or long chain, such as epoxystearyl acetate, epoxysatearyl stearate, glycidyl stearate, and polymerized glycidyl methacrylate.

The polyvinyl chloride resin can be in any physical form, including, for example, powders, films, sheets, molded articles, foams, filaments, and yarns.

A sufficient amount of the stabilizer system is used to enhance the resistance of the polyvinyl chloride to deterioration in physical properties, including, for example, discoloration and embrittlement, under the heat and/or light conditions to which the polymer will be subjected. Very small amounts are usually adequate. Amounts within the range from about 0.001 to about 15% liquid stabilizer system by weight of the polyvinyl chloride resin are satisfactory. Preferably, an amount within the range from about 0.05 to about 5%, is employed for optimum stabilizing effectiveness.

Inasmuch as all of the essential components are liquids, the liquid stabilizer systems of the invention are readily formed as homogeneous liquids by simple blending and mutual dissolution, with heating, if necessary, and comprise a blend of:

(a) barium carbonate-barium alkyl phenate in an amount within the range from about 20 to about 40 parts by weight;

(b) cadmium carboxylate selected from the groups noted in an amount within the range from about 25 to about 40 parts by weight; and (c) organic triphosphite in an amount within the range from about 25 to about 45 parts by weight.

In addition, the stabilizer systems can contain any one or more of the following amounts of optional ingredients:

(d) zinc carboxylate of any of the acids noted above in connection with the cadmium carboxylate in an amount within the range from about 1 to about 10 parts by weight;

(e) phenolic antioxidant in an amount within the range from about 0.01 to about 1 part by weight;

(f) free aliphatic carboxylix acid in an amount within the range from about 0.5 to about 5 parts by weight, but in no case more than 15% by weight of the cadmium carboxylate; and (g) acid phosphite in an amount within the range from about 0.5 to about 5 parts by weight.

The liquid stabilizer systems of the invention can be employed as the sole stabilizer. They can also be used in combination with other conventional heat and light stabilizers for polyvinyl chloride resins, such as, for example, hydroxybenzophenones, organotin compounds, and epoxy compounds.

In addition, any of the conventional polyvinyl chloride resin additives, such as lubricants, emulsifiers, entistatic agents, flame-proofing agents, pigments, and fillers, can be employed.

Preferably, the liquid stabilizer system is added to the polyvinyl chloride resin in an amount to provide in the resin from about 0.1 to about 2% of the barium carbonate-barium alkyl phenate; from about 0.1 to about 1.5% of the cadmium carboxylate salt; from about 0.2 to about 1% of the organic phosphite; and from about 0 to about 1% total of one or more of the additional ingredients, as noted above.

The liquid stabilizer system is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polyvinyl chloride resin can be worked into the desired shape, such as by milling, calendering, extrusion or injection molding, or fiber-forming. In such operations, it will be found to have a considerably improved resistance to discoloration and embrittlement on exposure to heat and light.

The following examples illustrate preferred liquid stabilizer systems and stabilized polyvinyl chloride resin compositions of the invention:

EXAMPLE 1

A group of rigid polyvinyl chloride resin compositions was prepared, having the following formulation:

| | Parts by Weight | | | |
|---|---|---|---|---|
| | Control with | | | |
| Ingredient | 1 Mark M | 2 Mark WS | 3 Cd:Ba 1.8:1 | Example 1 |
| Polyvinyl chloride homopolymer (Conoco 5385) | 100 | 100 | 100 | 100 |
| Methyl methacrylate-butadiene-styrene terpolymer KM323 B (impact modifier) | 6 | 6 | 6 | 6 |
| Methyl methacrylate-ethyl acrylate copolymer (K120N) | 1 | 1 | 1 | 1 |
| $CaCO_3$ filler (OMYA BSH) | 7 | 7 | 7 | 7 |
| $TiO_2$ | 3 | 3 | 3 | 3 |
| Epoxidized soyabean oil (Drapex 6.8) | 2 | 2 | 2 | 2 |
| 2-Hydroxy-4-octyloxy benzophenone | 0.5 | 0.5 | 0.5 | 0.5 |
| Stearic acid (lubricant) | 0.5 | — | 0.5 | 0.5 |
| Liquid stabilizer composed of (in weight %): | — | — | 2.5 | 2.5 |
| $BaCO_3$—Ba dodecyl phenate (Lubrizol LD 2106) | — | — | 21 | 29.2 |
| Cd—benzoate-Cd 2-ethyl-hexoate (1:1 - 20% Cd) | — | — | 46.9 | 27.7 |
| Diisodecyl phenyl phosphite | — | — | 27.2 | 37.0 |
| 1,1,3-tris(2'-methyl-4'-hydroxy-5'-tert-butylphenyl) butane | — | — | 0.7 | 0.9 |
| Diphenyl phosphite | — | — | 2.4 | 3.1 |
| Oleic Acid | — | — | 1.8 | 2.1 |
| Mark M[1] | 2.5 | — | — | — |
| Diisodecyl phenyl phosphite | — | 0.5 | — | — |
| Mark WS[2] | — | 2.5 | — | — |

-continued

|  | Parts by Weight | | | |
|---|---|---|---|---|
|  | Control with | | | |
| Ingredient | 1<br>Mark M | 2<br>Mark WS | 3<br>Cd:Ba<br>1.8:1 | Example<br>1 |
| Cd:Ba ratio in stabilizer | 0.45:1 | 1.8:1 | 1.8:1 | 0.73:1 |

[1]Mark M: Commercial liquid Ba/Cd stabilizer.
[2]Mark WS: Commercial solid Ba/Cd stabilizer.

The Cd benzoate-Cd 2-ethyl hexoate was prepared by the following procedure:

2-Ethylhexoic acid 269 g and 220 g benzoic acid were heated to 90° C. Cadmium oxide 231 g was added and allowed to react at 100° to 120° C. The water of reaction was removed by application of vacuum while heating to 175° C. To thin the product for filtration the mixture was then cooled to 120° C. and 30 g triethyl phosphate and 293 g monobutyl ether of diethylene glycol added. The filtered product contained 20% cadmium and 32.3% solvent.

These formulations were blended and sheeted off on a two-roll mill to form sheets 1 mm thick. Strips one inch wide were cut off the sheets and heat resistance of these sheets was then determined by placing the strips in a Geer forces air oven at 375° and 400° F., withdrawing the strips at fifteen minute intervals at 375° F. and at ten minute intervals at 400° F., and affixing the strips to cards, thus obtaining a progressive display of heat deterioration.

Colors were assigned by observation of the pieces, and these colors are given in Table I (375° F.) and Table II (400° F.).

TABLE I (375° F.)

| Time<br>(Minutes) | Control 1<br>Mark M | Control 2<br>Mark WS | Control 3 | Example<br>1 |
|---|---|---|---|---|
| 0 | White | White | White | White |
| 15 | Slight buff tint | White | White | White |
| 30 | Light yellow | White | White | White |
| 45 | Buff | Slight yellow tint | White | White |
| 60 | Orange | Light yellow | Slight buff tint | Slight yellow tint |
| 75 | Orange | Yellow | Light buff | Light yellow |
| 90 | Brown | Buff | Buff | Light buff |
| 105 | Brown | Buff | Grey | Buff |
| 120 | Brown | Tan | Grey | Tan |

TABLE II (400° F.)

| Time<br>(Minutes) | Control 1<br>Mark M | Control 2<br>Mark WS | Control 3 | Example<br>1 |
|---|---|---|---|---|
| 0 | White | White | White | White |
| 10 | Slight buff tint | Slight yellow tint | Slight yellow tint | White |
| 20 | Buff | Slight buff tint | Light yellow tint | Slight yellow tint |
| 30 | Orange | Buff | Light buff | Light yellow |
| 40 | Brown | Grey | Light tan | Light buff |
| 50 | Brown | Brown | Brown | Brown |
| 60 | Brown | Brown | Brown | Brown |
| 70 | Brown | Brown | Brown | Brown |
| 80 | Brown | Brown | Brown | Brown |

The heat stability results show the composition of the invention unexpectedly better than the commercial liquid stabilizer MARK M, Control 1, with Cd:Ba ratio below the ratio of this invention, or the commercial solid stabilizer MARK WS, Control 2, and the liquid stabilizer formulated from the identical ingredients, Control 3, both with the Cd:Ba ratio above the ratio of this invention.

In addition to the above heat stability tests, the heat distortion temperature was measured for samples of the solid MARK WS stabilizer composition, Control 2, and the composition of Example 1, and found to be 66° C. and 68° C., respectively. It is surprising to find the Example 1 composition containing the liquid stabilizer of this invention no worse, and even somewhat better, than the control composition containing the solid stabilizer.

EXAMPLE 2

A flexible polyvinyl chloride resin composition was prepared having the following formulation:

|  | Parts by Weight | |
|---|---|---|
| Ingredient | Example 2 | Control with commercial Ba—Cd—Zn—phosphite stabilizer composition |
| Polyvinyl chloride homopolymer (VC 100) | 100 | 100 |
| Dioctyl phthalate | 32 | 32 |
| CaCO$_3$ filler (Atomite) | 17 | 17 |
| Epoxidized octyl tallate (Drapex 4.4) | 4 | 4 |
| Liquid stabilizer composed of: | 2.3 | — |
| Barium carbonate-barium dodecyl phenate (Lubrizol LD 2106) | 28.8 | — |
| Cadmium benzoate-cadmium 2-ethyl-hexoate 1:1 (20% Cd)[1] | 27.4 | — |
| Diisodecyl phenyl phosphite | 36.5 | — |

-continued

| Ingredient | Parts by Weight | |
|---|---|---|
| | Example 2 | Control with commercial Ba—Cd—Zn—phosphite stabilizer composition |
| Zinc-2-ethyl-hexoate (22% Zn) | 1.4 | — |
| 1,1,3-tris (2'-methyl-4'-hydroxy-5'-tert-butylphenyl) butane (Topanol CA) | 0.9 | — |
| Diphenyl phosphite | 3 | — |
| Oleic acid | 2 | — |
| Mark M + Mark PL (Commercial Ba—Cd—Zn—phosphite stabilizer composition) | — | 2.3 |
| Stearic Acid (lubricant) | 0.25 | 0.25 |
| Cd:Ba ratio | 0.73:1 | 0.45:1 |

[1]Prepared as described in Example 1

This formulation was blended and sheeted off on a two-roll mill to form sheets 1 mm thick. Strips 1 inch wide were cut off the sheets and heat stability was evaluated by heating the strips in a Geer forced air oven at 350° F. and 375° F., withdrawing the strips at fifteen minute intervals, and affixing them to cards, to provide a progressive display of heat deterioration for each strip. The color of each piece was assigned by observation and shown in Table III (350° F.) and Table IV (375° F.).

There was also tested in the same formulation, and evaluated as a Control, the commercial barium/cadmium/zinc/ phosphite stabilizer composition.

TABLE III

| | (350° F.) | |
|---|---|---|
| | Color | |
| Time (Minutes) | Control | Example 2 |
| 0 | White | White |
| 15 | White | White |
| 30 | Off white | White |
| 45 | Off white | White |
| 60 | Light yellow | White |
| 75 | Light yellow | Off white |
| 90 | Light yellow | Off white |
| 105 | Light yellow | Off white |
| 120 | Light yellow with darkened corner | Off white |

TABLE IV

| | (375° F.) | |
|---|---|---|
| | Color | |
| Time (Minutes) | Control | Example 2 |
| 0 | White | White |
| 15 | Off white | White |
| 30 | Off white | White |
| 45 | Off white | White |
| 60 | Light yellow | Off white |
| 75 | Light yellow with dark corners | Off white |
| 90 | Light yellow with dark edges | Light yellow |
| 105 | Light yellow with dark edges | Light yellow with dark corners |
| 120 | Black | Yellow with dark edges |

The dramatic superiority of the composition of this invention, remaining unchanged in appearance more than twice as long as the Control composition, is evident from the above results.

EXAMPLE 3

A group of polyvinyl chloride resin compositions was prepared having the following formulation:

| Ingredient | Parts by Weight | |
|---|---|---|
| | Example 3 | Control with Mark WS and phosphite |
| Polyvinyl chloride homopolymer (Geon 103 EP) | 100 | 100 |
| Dioctyl phthalate | 50 | 50 |
| Epoxidized octyl tallate (Drapex 4.4) | 5 | 5 |
| Liquid stabilizer composed of: | 2.0 | — |
| BaCO$_3$—Ba dodecyl phenate (Lubrizol LD 2106) | 29.2 | — |
| Cd—benzoate-Cd 2-ethyl hexoate (1:1 - 20% Cd)[1] | 27.7 | — |
| Diisodecyl phenyl phosphite | 37.0 | — |
| 1,1,3-tris (2'-methyl-4'-hydroxy-5'-tert-butyl-phenyl)butane (Topanol CA) | 0.9 | — |
| Diphenyl phosphite | 3.1 | — |
| Oleic Acid | 1.8 | — |
| Mark WS (commercial solid Ba/Cd stabilizer) | — | 1.5 |
| Phenyl diisodecyl phosphite | — | 0.5 |
| Stearic acid (lubricant) | 0.25 | — |
| Cd:Ba ratio | 0.73:1 | 1.8:1 |

[1]Prepared as in Example 1

These formulations were blended and sheeted off on a two-roll mill to form sheets 1 mm thick. The heat resistance of these sheets was then determined by cutting off strips 1 inch wide and heating the strips in a Geer forced air oven at 375° and 400° F., withdrawing the strips at fifteen minute intervals at 375° F. and at ten minute intervals at 400° F., and affixing them to cards, thus obtaining a progressive display of the heat deterioration of each strip. Colors were assigned to the pieces by observation, and are noted in Table V (375° F.) and Table VI (400° F.).

TABLE V

| | (375° F.) | |
|---|---|---|
| | Color | |
| Time (Minutes) | Mark WS and Phosphite | Example 3 |
| Initial | Colorless | Colorless |
| 15 | Slight yellow | Colorless |

TABLE V-continued

| | (375° F.) | |
|---|---|---|
| | Color | |
| Time (Minutes) | Mark WS and Phosphite | Example 3 |
| 30 | Slight yellow tint | Colorless |
| 45 | Light yellow | Slight yellow tint |
| 60 | Light yellow | Slight yellow tint |
| 75 | Light yellow | Slight yellow tint |
| 90 | Light yellow | Slight yellow tint |
| 105 | Yellow | Light yellow |
| 120 | Yellow | Light yellow |

TABLE VI

| | (400° F.) | |
|---|---|---|
| | Color | |
| Time (Minutes) | Mark WS and Phosphite | Example 3 |
| Initial | Colorless | Colorless |
| 10 | Slight yellow tint | Colorless |
| 20 | Light yellow | Slight yellow tint |
| 30 | Yellow with darkened corner | Light yellow |
| 40 | Yellow with brown edges | Yellow with darkened corner |
| 50 | Black | Yellow with brown edges |
| 60 | Black | Black |

The unexpected superiority of the stabilizer composition of Example 3 is evident from the above results.

EXAMPLE 4

A group of polyvinyl chloride resin compositions was prepared having the following formulation:

| | Parts by Weight | |
|---|---|---|
| Ingredient | Example 4 | Control with Mark WS and Phosphite |
| Polyvinyl chloride homopolymer (Diamond 450) | 100 | 100 |
| Phthalic acid esters of mixed $C_7$ to $C_{11}$ alcohols (Santicizer 711) | 40 | 40 |
| Epoxidized soyabean oil (Drapex 6.8) | 5 | 5 |
| $TiO_2$ | 5 | 5 |
| Liquid stabilizer composed of: | 3.0 | — |
| $BaCO_3$—Ba dodecyl phenate (Lubrizol LD 2106) | 29.2 | — |
| Cd—benzoate-Cd 2-ethyl hexoate (1:1 - 20% Cd)[1] | 27.7 | — |
| Diisodecyl phenyl phosphite | 37.0 | — |
| 1,1,3-tris (2'-methyl-4'-hydroxy-5'-tert-butylphenyl) butane (Topanol CA) | 0.9 | — |
| Diphenyl phosphite | 3.1 | — |
| Oleic acid | 2.1 | — |
| Mark WS | — | 3.0 |
| composed of: | | |
| Barium laurate | — | 26.7 |
| Cadmium laurate | — | 53.3 |
| Pentaerythritol | — | 13.3 |
| Bisphenol A | — | 6.7 |
| Phenyl diisodecyl phosphite | — | 0.5 |
| Stearic Acid | 0.25 | — |
| Cd:Ba ratio | 0.73:1 | 1.8:1 |

[1]Prepared as described in Example 1

These formulations were blended and sheeted off on a two-roll mill to form sheets 1 mm thick. The heat resistance of these sheets was then determined by cutting of strips 1 inch wide and heating the strips in a Geer forced air oven at 375° F. and 400° F., withdrawing the strips at fifteen minute intervals at 375° F. and at ten minute intervals at 400° F., and affixing them to cards, thus obtaining a progressive display of the heat deterioration of each strip. Colors were assigned to the strips by observation, and are noted in Table VIII (375° F.) and Table IX (400° F.).

TABLE VIII

| | (375° F.) | |
|---|---|---|
| | Color | |
| Time (Minutes) | Mark WS and Phosphite | Example 4 |
| Initial | White | White |
| 15 | White | White |
| 30 | White | White |
| 45 | Slight yellow tint | White |
| 60 | Slight yellow tint | White |
| 75 | Slight yellow tint | Slight yellow tint |
| 90 | Slight yellow tint | Slight yellow tint |
| 105 | Light yellow | Light yellow |
| 120 | Light tan | Light tan |

TABLE IX

| | (400° F.) | |
|---|---|---|
| | Color | |
| Time (Minutes) | Mark WS and Phosphite | Example 4 |
| Initial | White | White |
| 10 | White | White |
| 20 | Slight yellow tint | White |
| 30 | Light yellow | Slight yellow tint |
| 40 | Yellow | Light yellow |
| 50 | Light buff | Light buff |
| 60 | Buff | Light buff |
| 70 | Grey | Buff |
| 80 | Grey-brown | Buff with dark edges |

The results of these comparisons show the dramatically longer retention of very good initial color by the composition of Example 4.

EXAMPLES 5 to 11

A group of polyvinyl chloride resin compositions was prepared having the following formulation:

| | | Parts by Weight | | | | | | |
|---|---|---|---|---|---|---|---|---|
| | Examples | Control | | | | | Example | |
| Ingredient | 5 to 9 | A | B | C | D | E | 10 | 11 |
| Polyvinyl chloride homopolymer | 100 | 100 | 100 | 100 | 100 | 100 | 100 | 100 |

-continued

| | | | | | | | | |
|---|---|---|---|---|---|---|---|---|
| (Diamond 450) | | | | | | | | |
| Phthalic acid esters of mixed C$_7$ to C$_{11}$ alcohols (Santicizer 711) | 40 | 40 | 40 | 40 | 40 | 40 | 40 | 40 |
| Epoxidized soyabean oil (Drapex 6.8) | 5 | 5 | 5 | 5 | 5 | 5 | 5 | 5 |
| TiO$_2$ | 5 | 5 | 5 | 5 | 5 | 5 | 5 | 5 |
| Stearic Acid | 0.25 | 0.25 | 0.25 | 0.25 | 0.25 | 0.25 | 0.25 | 0.25 |
| Liquid stabilizer having composition shown | 3.0 | 3.0 | 3.0 | 3.0 | 3.0 | 3.0 | 3.0 | 3.0 |
| BaCO$_3$—Ba dodecyl phenate (Lubrizol LD 2106) | See below | 50 | 47 | 42 | 47 | 47 | 30 | 30 |
| Cd—benzoate-Cd 2-ethyl hexoate (1:1 - 20% Cd) | See below | 13 | 16 | 21 | — | — | — | — |
| Cd—benzoate-Cd 2-ethyl hexoate (1:3 - 20% Cd) | — | — | — | — | 16 | — | 33 | — |
| Cd—2-ethyl hexoate (20% Cd) | — | — | — | — | — | 16 | — | 33 |
| Diisodecyl phenyl phosphite | 33 | 33 | 33 | 33 | 33 | 33 | 33 | 33 |
| 1,1,3-tris (2'methyl-4'-hydroxy-5'-tert-butyl-phenyl butane (Topanol CA) | 0.8 | 0.8 | 0.8 | 0.8 | 0.8 | 0.8 | 0.8 | 0.8 |
| Diphenyl phosphite | 2 | 2 | 2 | 2 | 2 | 2 | 2 | 2 |
| Oleic acid | 1.2 | 1.2 | 1.2 | 1.2 | 1.2 | 1.2 | 1.2 | 1.2 |
| Cd:Ba ratio | See below | 0.19:1 | 0.25:1 | 0.37:1 | 0.25:1 | 0.25:1 | 0.85:1 | 0.85:1 |

| | Example No. | | | | |
|---|---|---|---|---|---|
| | 5 | 6 | 7 | 8 | 9 |
| BaCO$_3$—Ba dodecyl phenate (Lubrizol LD 2106) | 37 | 33 | 30 | 26 | 21 |
| Cd—benzoate-Cd 2-ethyl hexoate (1:1 - 20% Cd) | 26 | 30 | 33 | 37 | 42 |
| Cd:Ba ratio | 0.52:1 | 0.67:1 | 0.85:1 | 1.06:1 | 1.48:1 |

The Cd benzoate-Cd 2-ethyl hexoate of Examples 5 to 9 and Controls A to C was prepared by the following procedure:

2-Ethylhexoic acid 269 g and 220 g benzoic acid were heated to 90° C. Cadmium oxide 231 g was added and allowed to react at 100° to 120° C. The water of reaction was removed by application of vacuum while heating to 175° C. To thin the product for filtration the mixture was then cooled to 120° C. and 30 g triethyl phosphate and 293 g monobutyl ether of diethylene glycol added. The filtered product contained 20% cadmium and 32.3% solvent.

For Example 10 and Control D, the same procedure was followed, except that the amounts of the components were as follows:

2-Ethylhexoic acid: 409 g
Benzoic acid: 110 g
Diethylene glycol monobutyl ether: 253 g
Cadmium oxide: 231 g
Triethyl phosphate (after reaction): 30 g The filtered product contained 20% cadmium and 28.3% solvent.

For Example 11 and Control E, the procedure was as follows:

2-Ethyl hexoic acid 601 g and 223 g aliphatic hydrocarbon mixture of boiling range 180° to 200° C. were heated to 90° C. Cadmium oxide 251 g was added and allowed to react at 100° to 120° C. The water of reaction and some of the hydrocarbon was removed by application of vacuum. To thin the product for filtration there were added 32 g triethyl phosphate, 14 g isodecyl alcohol, and 14 g monobutyl ether of diethylene glycol. The filtered product contained 20.0% cadmium, and 25.6% solvent.

These formulations were blended and sheeted off on a two-roll mill to form sheets 1 mm thick. Strips one inch wide were cut off the sheets and heat resistance of these sheets was then determined by placing the strips in a Geer forced air oven at 350° F., 375° F., withdrawing the strips at fifteen minute intervals at 350° and 375° F., and at ten minute intervals at 400° F., and affixing them to cards, thus obtaining a progressive display of heat deterioration.

Colors were assigned by observation of the pieces, and these colors are given in Table X (350° F.), Table XI (375° F.) and Table XII (400° F.).

TABLE X

| | (350° F.) | | | | | | | | | | | |
|---|---|---|---|---|---|---|---|---|---|---|---|---|
| Time | Control | | | Example No. | | | | | | | Control | |
| (Minutes) | A | B | C | 5 | 6 | 7 | 8 | 9 | 10 | 11 | D | E |
| 0 | White | White | White | White | White | White | White | White | White | White | White | White |
| 15 | White | White | White | White | White | White | White | White | White | White | White | White |
| 30 | Slight yellow tint | White | White | White | White | White | White | White | White | White | Slight yellow tint | Slight yellow tint |
| 45 | Light yellow | Slight yellow tint | White | White | White | White | White | White | White | White | Slight yellow tint | Slight yellow tint |
| 60 | Yellow | Light yellow | Slight yellow tint | White | White | White | White | White | White | White | Light yellow | Light yellow |
| 75 | Yellow | Light yellow | Slight yellow | White | White | White | White | White | White | White | Light yellow | Light yellow |

TABLE X-continued

| | | | | (350° F.) | | | | | | | | |
|---|---|---|---|---|---|---|---|---|---|---|---|---|
| Time | Control | | | Example No. | | | | | | | Control | |
| (Minutes) | A | B | C | 5 | 6 | 7 | 8 | 9 | 10 | 11 | D | E |
| 90 | Dark yellow | Yellow | tint Slight yellow tint | Slight yellow tint | White | White | White | White | White | White | Yellow | Yellow |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |
| 105 | Dark yellow | Yellow | Slight yellow tint | Slight yellow tint | White | White | White | White | White | White | Yellow | Yellow |
| 120 | Dark yellow | Dark yellow | Yellow | Slight yellow tint | White | White | White | White | White | White | Yellow | Yellow |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |

TABLE XI

| | | | | (375° F.) | | | | | | | | |
|---|---|---|---|---|---|---|---|---|---|---|---|---|
| Time | Control | | | Example No. | | | | | | | Control | |
| (Minutes) | A | B | C | 5 | 6 | 7 | 8 | 9 | 10 | 11 | D | E |
| 0 | White | White | White | White | White | White | White | White | White | White | White | White |
| 15 | Slight yellow tint | White | White | White | White | White | White | White | White | White | Slight yellow tint | Slight yellow tint |
| 30 | Light yellow | Slight yellow tint | White | White | White | White | White | White | White | White | Slight yellow tint | Slight yellow tint |
| 45 | Light yellow | Slight yellow tint | Slight yellow tint | White | White | White | White | White | White | White | Light yellow | Light yellow tint |
| 60 | Yellow | Light yellow | Slight yellow tint | White | White | White | White | White | White | White | Light yellow | Light yellow |
| 75 | Brown | Yellow | Slight yellow tint | White | White | White | Slight yellow tint | Slight yellow tint | Slight yellow tint | Slight yellow tint | Yellow with brown edges | Yellow with brown edges |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |
| 90 | Brown | Brown | Yellow with brown edges | Light yellow | Light yellow | Light yellow | Light yellow | Light yellow | Light yellow | Light yellow | Brown | Brown |
| 105 | Brown | Brown | Brown | Buff | Buff | Buff | Buff | Buff | Buff | Buff | Brown | Brown |
| 120 | Brown | Brown | Brown | Buff | Buff | Buff | Buff | Buff | Buff | Buff | Brown | Brown |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |

TABLE XII

| | | | | (400° F.) | | | | | | | | |
|---|---|---|---|---|---|---|---|---|---|---|---|---|
| Time | Control | | | Example No. | | | | | | | Control | |
| | A | B | C | 5 | 6 | 7 | 8 | 9 | 10 | 11 | D | E |
| 0 | White | White | White | White | White | White | White | White | White | White | White | White |
| 15 | White | White | White | White | White | White | White | White | White | White | White | White |
| 10 | Slight yellow tint | White | White | White | White | White | White | White | White | White | White | Slight yellow tint |
| 15 | Slight yellow tint | Slight yellow tint | White | White | White | White | White | White | White | White | Slight yellow tint | Slight yellow tint |
| 20 | Buff | Light yellow | Slight yellow tint | White | White | White | White | White | White | White | Light yellow | Light yellow |
| 25 | Tan | Buff | Slight yellow tint | Slight yellow tint | Slight yellow tint | Slight yellow tint | Slight yellow tint | Slight yellow tint | Slight yellow tint | Slight yellow tint | Buff | Light yellow |
| 30 | Brown | Buff | Yellow | Yellow | Slight yellow tint | Slight yellow tint | Slight yellow tint | Slight yellow tint | Slight yellow tint | Slight yellow tint | Buff | Buff |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |
| 35 | Brown | Brown | Brown | Buff | Buff | Buff | Yellow | Yellow | Yellow | Yellow | Brown | Brown |
| 40 | Brown | Brown | Brown | Buff | Buff | Buff | Buff | Grey | Buff | Buff | Brown | Brown |

TABLE XII-continued

| | Control | | | (400° F.) Example No. | | | | | | | Control | |
|---|---|---|---|---|---|---|---|---|---|---|---|---|
| Time | A | B | C | 5 | 6 | 7 | 8 | 9 | 10 | 11 | D | E |
| Ba:Cd ratio | 0.19:1 | 0.25:1 | 0.37:1 | 0.52:1 | 0.67:1 | 0.85:1 | 1.06:1 | 1.48:1 | 0.85:1 | 0.85:1 | 0.25:1 | 0.25:1 |

The results of the above comparison of the stabilizer compositions of Examples 5 to 11 to those of Controls A to E containing the identical ingredients and differing only in the proportions, with the cadmium to barium ratio being outside the range of this invention (0.5 to 1 through 1.5 to 1), demonstrate the criticality of the ratio in obtaining the unexpectedly effective color stability demonstrated.

Having regard to the foregoing disclosure, the following is claimed as inventive and patentable embodiments thereof:

1. A homogeneous storage-stable liquid stabilizer system for polyvinyl chloride resins which is substantially solvent-free and has a low viscosity and a minimum flash point of 96° C., consisting essentially of:
   (1) a liquid barium carbonate-alkyl phenate stabilizer;
   (2) a cadmium salt of a carboxylic acid selected from the group consisting of branched chain aliphatic carboxylic acids having from about five to about thirteen carbon atoms, aromatic carboxylic acids having from about seven to about eleven carbon atoms, and unsaturated aliphatic carboxylic acids having from about twelve to about twenty-two carbon atoms; and
   (3) a liquid organic triphosphite; the sum of the weight percent of barium and the weight percent of cadmium being at least 13%; and the ratio of the weight percent of cadmium to the weight percent of barium Cd:Ba being within the range from about 0.5:1 to about 1.5:1; the organic triphosphite being in an amount to form a homogeneous storage-stable liquid.

2. A stabilizer system according to claim 1 comprising, in addition, at least one member of the group consisting of:
   (a) a soluble zinc salt of a carboxylic acid;
   (b) a soluble phenolic antioxidant;
   (c) a soluble carboxylic acid; and
   (d) a liquid organic acid phosphite.

3. A stabilizer system according to claim 1 in which the cadmium salt is a salt of a mixture of aliphatic and aromatic acids.

4. A stabilizer system according to claim 1 in which the liquid barium carbonate-alkyl phenate comprises barium carbonate combined with at least one barium alkyl phenate in a nonvolatile organic liquid which acts as a liquefying agent for the carbonate.

5. A stabilizer system according to claim 4 in which the organic liquid is selected from the group consisting of hydrocarbon oils, plasticizers, epoxy esters, and mixtures thereof.

6. A stabilizer system according to claim 1 in which the metal ratio of barium carbonate to barium alkyl phenate is a number within the range from 2 to 20.

7. A stabilizer system according to claim 1 in which the alkyl phenate residue of the barium alkyl phenate has at least ten up to about one hundred fifty carbon atoms.

8. A stabilizer system according to claim 1 in which the ratio of total barium to the organic moiety in the barium carbonate-barium alkyl phenate is greater than the stoichiometric ratio of the neutral barium alkyl phenate.

9. A stabilizer system according to claim 8 in which the barium carbonate-barium alkyl phenate is barium carbonate-barium dodecyl phenate containing from 23 to 29% Ba.

10. A stabilizer system according to claim 1 in which the cadmium carboxylate salt is a liquid.

11. A stabilizer system according to claim 10 in which the cadmium salt is a salt of 2-ethyl hexoic acid and benzoic acid.

12. A stabilizer system according to claim 1 in which the cadmium carboxylate salt is liquefied in course of preparation, by carrying out the formation of the salt in the presence of a high-boiling organic solvent for the resulting cadmium carboxylate, this solvent accompanying the salt in the stabilizer system in an amount not exceeding 12% solvent by weight of the stabilizer system, after combination of the liquefied cadmium carboxylate with the other components.

13. A stabilizer system according to claim 12 in which the solvent is selected from the group consisting of aliphatic, cycloaliphatic and aromatic hydrocarbons; and aliphatic, cycloaliphatic and aromatic alcohols, ether alcohols, and ether alcohol esters; and esters of organic and inorganic acids.

14. A stabilizer system according to claim 1 in which the organic triphosphite ester is a liquid over the temperature range from about $-10°$ C. up to about 200° C.

15. A stabilizer system according to claim 1 in which the liquid organic triphosphite is defined by the formula:

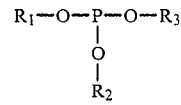

in which
   $R_1$, $R_2$ and $R_3$ are selected from the group consisting of alkyl, alkenyl, aryl, alkaryl, aralkyl, and cycloalkyl groups having from one to about thirty carbon atoms.

16. A stabilizer system according to claim 1 in which the liquid organic triphosphite is defined by the formula:

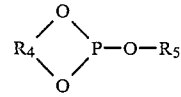

in which
   $R_4$ is a bivalent organic radical selected from the group consisting of alkylene, arylene, aralkylene, alkarylene and cycloalkylene radicals having from two to about thirty carbon atoms, and $R_5$ is a monovalent organic radical selected from the group consisting of alkyl, alkenyl, aryl, alkaryl, aralkyl, and cycloalkyl groups having from one to about thirty carbon atoms.

17. A stabilizer system according to claim 1 in which the liquid organic triphosphite is defined by the formula:

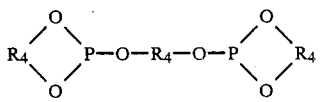

in which
R$_4$ is a bivalent organic radical selected from the group consisting of alkylene, arylene, aralkylene, alkarylene and cycloalkylene radicals having from two to about thirty carbon atoms.

18. A stabilizer system according to claim 1 in which the liquid organic triphosphite is defined by the formula:

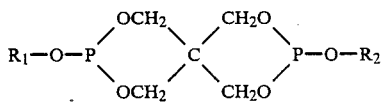

where R$_1$ and R$_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

19. A stabilizer system according to claim 1, comprising, in addition, a liquid organic acid phosphite.

20. A stabilizer system according to claim 19 in which the acid phosphite is defined by the formula:

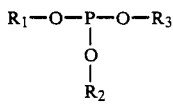

in which
R$_1$, R$_2$ and R$_3$ are selected from the group consisting of hydrogen, alkyl, alkenyl, aryl, alkaryl, aralkyl, and cycloalkyl groups having from one to about thirty carbon atoms, and at least one to two of R$_1$, R$_2$ and R$_3$ is hydrogen.

21. A stabilizer system according to claim 1, comprising, in addition, a free soluble carboxylic acid.

22. A stabilizer system according to claim 21 in which the free soluble carboxylic acid is in an amount not exceeding about 15% by weight of the cadmium carboxylate salt.

23. A stabilizer system according to claim 21 in which the soluble carboxylic acid is an unsaturated aliphatic acid.

24. A stabilizer system according to claim 1, comprising, in addition, a phenolic antioxidant.

25. A stabilizer system according to claim 24 in which the phenolic antioxidant has at least one phenolic hydroxyl group, at least one phenolic nucleus, and from about eight to about three hundred carbon atoms.

26. A stabilizer system according to claim 24 in which the phenolic antioxidant is a monocyclic phenol having the structure:

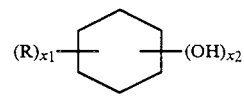

wherein
R is selected from the group consisting of hydrogen; halogen, and organic radicals containing from one to about thirty carbon atoms selected from the group consisting of alkyl, aryl, alkenyl, alkaryl, aralkyl, cycloalkenyl, cycloalkyl, alkoxy, and acyl

where
R' is aryl, alkyl or cycloalkyl;
x$_1$ and x$_2$ are integers from one to four, and the sum of x$_1$ and x$_2$ does not exceed six.

27. A stabilizer system according to claim 24 in which the antioxidant has the formula:

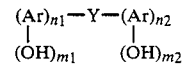

wherein
Y is a polyvalent linking group selected from the group consisting of oxygen; carbonyl; aromatic, aliphatic and cycloaliphatic hydrocarbon groups and oxyhydrocarbon groups having from one up to twenty carbon atoms;
Ar is a phenolic nucleus containing at least one free phenolic hydroxyl group up to a total of five;
m$_1$ and m$_2$ are numbers from one to five, and
n$_1$ and n$_2$ are numbers from one to four.

28. A stabilizer system according to claim 27 in which Ar is a benzene nucleus.

29. A stabilizer system according to claim 1 comprising, in addition, a zinc salt of a carboxylic acid selected from the group consisting of branched chain aliphatic carboxylic acids having from about five to about thirteen carbon atoms; aromatic carboxylic acids having from about seven to about eleven carbon atoms; and unsaturated aliphatic carboxylic acids having from about twelve to about twenty-two carbons.

30. A stabilizer system according to claim 1 comprising a blend of:
(a) barium carbonate-barium alkyl phenate in an amount within the range from about 20 to about 40 parts by weight;
(b) cadmium carboxylate in an amount within the range from about 25 to about 40 parts by weight; and
(c) organic triphosphite in an amount within the range from about 25 to about 45 parts by weight.

31. A stabilizer system according to claim 30 comprising at least one member of the group consisting of:
(a) zinc carboxylate in an amount within the range from about 1 to about 10 parts by weight;
(b) phenolic antioxidant in an amount within the range from about 0.01 to about 1 part by weight;
(c) free carboxylic acid in an amount within the range from about 0.5 to about 5 parts by weight, but in no case more than 15% by weight of the cadmium carboxylate; and (d) acid phosphite in an amount within the range from about 0.5 to about 5 parts by weight.

32. A stabilizer system according to claim 1 comprising, in addition, at least one member of the group consisting of an additional heat stabilizer for polyvinyl chloride resins and an additional light stabilizer for polyvinyl chloride resins.

33. A polyvinyl chloride resin composition having improved resistance to deterioration when heated at 350° F., comprising a polyvinyl chloride resin formed at least in part of the recurring group:

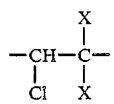

and having a chlorine content in excess of 40%, where X is either hydrogen or chlorine; and an amount to enhance the resistance to deterioration of the resin of a stabilizer composition according to claim 1.

34. A polyvinyl chloride resin composition in accordance with claim 33 in which the polyvinyl chloride resin is polyvinyl chloride homopolymer.

35. A polyvinyl chloride resin composition in accordance with claim 33 in which the polyvinyl chloride resin is a copolymer of vinyl chloride and vinyl acetate.

36. A polyvinyl chloride resin composition having improved resistance to deterioration when heated at 350° F., comprising a polyvinyl chloride resin formed at least in part of the recurring group:

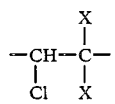

and having a chloride content in excess of 40%, where X is either hydrogen or chlorine; and an amount to enhance the resistance to deterioration of the resin of a stabilizer composition according to claim 2.

37. A polyvinyl chloride resin composition having improved resistance to deterioration when heated at 350° F., comprising a polyvinyl chloride resin formed at least in part of the recurring group:

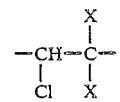

and having a chlorine content in excess of 40%, where X is either hydrogen or chlorine; and an amount to enhance the resistance to deterioration of the resin of a stabilizer composition according to claim 3.

38. A polyvinyl chloride resin composition having improved resistance to deterioration when heated at 350° F., comprising a polyvinyl chloride resin formed at least in part of the recurring group:

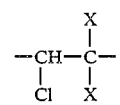

and having a chlorine content in excess of 40%, where X is either hydrogen or chlorine; and an amount to enhance the resistance to deterioration of the resin of a stabilizer composition according to claim 8.

39. A polyvinyl chloride resin composition having improved resistance to deterioration when heated at 350° F., comprising a polyvinyl chloride resin formed at least in part of the recurring group:

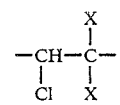

and having a chlorine content in excess of 40%, where X is either hydrogen or chlorine; and an amount to enhance the resistance to deterioration of the resin of a stabilizer composition according to claim 30.

40. A polyvinyl chloride resin composition having improved resistance to deterioration when heated at 350° F., comprising a polyvinyl chloride resin formed at least in part of the recurring group:

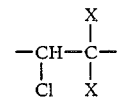

and having a chlorine content in excess of 40% where X is either hydrogen or chlorine; and an amount to enhance the resistance to deterioration of the resin of a stabilizer composition according to claim 31.

41. A polyvinyl chloride resin composition according to claim 33 which is formulated as a rigid polyvinyl chloride resin to withstand a processing temperature of at least 375° F.

* * * * *